United States Patent
Choi et al.

(10) Patent No.: US 9,127,215 B2
(45) Date of Patent: Sep. 8, 2015

(54) METHOD FOR REDUCING THE AMOUNT OF ORGANIC ACIDS IN A HYDROCARBON OIL FRACTION

(75) Inventors: Jin Kyu Choi, Daejeon (KR); Cheol Woo Park, Daejeon (KR); Tae Won Uhm, Daejeon (KR); Il Yong Jeong, Seoul (KR); Ha Na Song, Siheung-si (KR); Do Woan Kim, Daejeon (KR); Hee Jung Jeon, Daejeon (KR); Gyung Rok Kim, Daejeon (KR); Cheol Joong Kim, Daejeon (KR); Do Hyoun Kim, Daejeon (KR); Chang Woo Joo, Daejeon (KR)

(73) Assignees: SK INNOVATION CO., LTD., Seoul (KR); SK ENERGY CO., LTD., Seoul (KR)

( * ) Notice: Subject to any disclaimer, the term of this patent is extended or adjusted under 35 U.S.C. 154(b) by 0 days.

(21) Appl. No.: 13/979,044

(22) PCT Filed: Jan. 4, 2012

(86) PCT No.: PCT/KR2012/000080
§ 371 (c)(1),
(2), (4) Date: Jul. 10, 2013

(87) PCT Pub. No.: WO2012/096470
PCT Pub. Date: Jul. 19, 2012

(65) Prior Publication Data
US 2013/0289328 A1    Oct. 31, 2013

(30) Foreign Application Priority Data

Jan. 10, 2011  (KR) .................. 10-2011-0002297
Jan. 3, 2012   (KR) .................. 10-2012-0000367

(51) Int. Cl.
*C10G 45/02*     (2006.01)
*C10G 45/22*     (2006.01)
(Continued)

(52) U.S. Cl.
CPC .............. *C10G 45/22* (2013.01); *B01J 23/883* (2013.01); *C10G 3/42* (2013.01); *C10G 3/50* (2013.01);
(Continued)

(58) Field of Classification Search
CPC .................................. C10G 3/50; C10G 45/02
See application file for complete search history.

(56) References Cited

U.S. PATENT DOCUMENTS 2,921,023 A   1/1960   Holm et al.
5,683,626 A   11/1997  Sartori et al.
(Continued)

FOREIGN PATENT DOCUMENTS

EP          0092428 A2      10/1983
KR    10-2001-0023446 A     3/2001
WO         96/06899 A        3/1996

OTHER PUBLICATIONS

WIPO 2012/096470 A3, Jul. 19, 2012, International Search Report, International Application No. PCT/KR2012/000080, "Method for Reducing the Amount of Organic Acids in a Hydrocarbon Oil Fraction."

*Primary Examiner* — Tam M Nguyen
(74) *Attorney, Agent, or Firm* — Bracewell & Giuliani LLP; Brad Y. Chin

(57) ABSTRACT

Provided is a method for reducing the amount of organic acids in a hydrocarbon oil fraction by hydrogenating the organic acids in the hydrocarbon oil fraction under mild conditions. Provided is a new method able to overcome the problem of organic-acid-induced corrosion during the process of distillation, by using hydrogen or a hydrogen-containing mixed gas and a hydrogenation catalyst to subject the organic acids in the hydrocarbon oil fraction to hydrogenation at an appropriate temperature and pressure, thereby converting the same to hydrocarbons and so reducing the amount of organic acids in the hydrocarbon oil fraction.

13 Claims, 1 Drawing Sheet

(51) Int. Cl.
*B01J 23/883* (2006.01)
*C10G 3/00* (2006.01)
*C10G 67/02* (2006.01)
*C10L 1/02* (2006.01)
*C10L 1/04* (2006.01)

(52) U.S. Cl.
CPC ............... *C10G 45/02* (2013.01); *C10G 67/02* (2013.01); *C10L 1/02* (2013.01); *C10L 1/04* (2013.01); *C10G 2300/202* (2013.01); *C10G 2300/203* (2013.01); *C10G 2300/4075* (2013.01)

(56) References Cited

U.S. PATENT DOCUMENTS

| | | |
|---|---|---|
| 5,897,769 A | 4/1999 | Trachte et al. |
| 6,054,042 A | 4/2000 | Gorbaty et al. |
| 6,063,266 A | 5/2000 | Grande et al. |
| 6,086,751 A | 7/2000 | Bienstock et al. |
| 6,096,196 A | 8/2000 | Varadaraj et al. |
| 6,258,258 B1 | 7/2001 | Sartori et al. |
| 8,697,598 B2 * | 4/2014 | Long et al. ............ 502/315 |
| 2006/0016723 A1 | 1/2006 | Tang et al. |

* cited by examiner

METHOD FOR REDUCING THE AMOUNT OF ORGANIC ACIDS IN A HYDROCARBON OIL FRACTION

RELATED APPLICATIONS

This application is related to, and claims priority to, PCT Patent Application No. PCT/KR2012/000080, filed on Jan. 4, 2012, which claims priority to Korean Patent Application Serial Nos. 10-2012-0000367, filed on Jan. 3, 2012, and 10-2011-0002297, filed on Jan. 10, 2011, the disclosures of which are incorporated herein by reference in their entirety.

BACKGROUND

1. Field of the Invention

The present invention relates to a method of converting organic acids in a hydrocarbon oil fraction, particularly a hydrocarbon oil fraction such as crude oil or atmospheric residual oil, into hydrocarbons, thereby reducing the amount of organic acids.

2. Description of Related Art

Crude oil contains a variety of kinds of impurities, among which organic acids are a representative material that causes high corrosion action upon crude oil processing. The organic acid content is represented by total acid number (TAN, mg KOH/g), which is the mass (mg) of KOH consumed to titrate an acid contained in 1 g of a sample. Generally, crude oil having a TAN greater than 0.5 mg/KOH is classified as high acidity crude oil.

High acidity crude oil is mainly being produced in West Africa, the North Sea, China, and South America. Although high acidity crude oil was not developed in the past low-oil-price era, as the price of oil is now higher and profitability is ensured, the production of high acidity crude oil is gradually increasing. In particular, West Africa and South America have led an increase in the production of high acidity crude oil, and the production of high acidity crude oil is considered to further increase in the future.

High acidity crude oil is composed mostly of heavy oil and has a low sulfur content, and is mainly processed for power generation or shipping fuel. Accordingly, profitability of high acidity crude oil depends on the market conditions of power generation and shipping fuels. With the effort of reducing greenhouse gas emissions and the increase in the price of crude oil all over the world, the use of industrial and power generation fuels is expected to decrease, and the oil supply exceeds the oil demand due to construction of large crude oil refining facilities, and thus simple refining margins are considered to be negative. As the demand for industrial and power generation fuels and the simple refining margins are decreased, processing of high acidity crude oil so as to be adapted for fuel production is regarded as economically poor. However, the case where high acidity crude oil is applied to a process for upgrading low-grade heavy oil fractions to high-quality light oil fractions is expected to manifest good profitability.

Typical techniques for processing high acidity crude oil include mixing it with general crude oil having low acidity, processing it using an anticorrosive agent, and using process units made of anticorrosive materials. However, these methods are disadvantageous because high acidity crude oil may be processed in a refining process, and initial investment costs are excessively high. If low-priced high acidity crude oil is economically processed and applied to an upgrading process, economic efficiency is considered to increase.

U.S. Pat. Nos. 6,054,042 and 6,096,196 describe a method of neutralizing organic acids in high acidity crude oil using a variety of neutralizing agents to decrease corrosiveness. However, in the case where the neutralizing agent is used, it forms a salt along with the organic acid, and such a salt functions as a surfactant, thus forming an emulsion in a desalination process. In the case where an excess of emulsion is produced, oil-water separation does not efficiently occur in a desalter, and thus water may flow into the crude oil, undesirably causing problems in the subsequent processes.

U.S. Pat. Nos. 5,683,626 and 6,258,258 and European Patent No. 092428 describe a method of converting organic acids into esters, amides, or ketones using ammonium hydroxide, ammonia, and manganese oxide to decrease corrosiveness of organic acids. However, this method is difficult to apply to actual processes because of a long reaction time, and the compounds produced after the reaction are unstable, and thus may be converted again into organic acids, making it difficult to achieve industrial application.

Further, U.S. Pat. No. 6,086,751 describes a method of thermally treating crude oil or a residual oil fraction at a high temperature of 350~400° C. for a period of time ranging from tens of minutes to ones of hours, so that the total acid number of the hydrocarbon oil fraction is lowered to 0.5 or less, wherein the inert gas is placed in a reactor, and water, carbon monoxide, carbon dioxide, etc., produced via decarboxylation are removed, and thereby the total acid number may be further decreased. However, to increase the decrement of the total acid number, the addition of an inert gas is undesirably required.

U.S. Patent Application No. 2006/0016723A1 describes a method of decreasing corrosiveness via decarboxylation of organic acids using a metal oxide as a catalyst. The metal oxide used as the catalyst may include magnesium oxide, calcium oxide, etc., and particularly, magnesium oxide is superior in terms of the decrement of the total acid number or long-term stability. However, upon actual use of magnesium oxide, the decrement of the total acid number is low, and catalytic activity is not maintained for a long period of time.

U.S. Pat. No. 6,063,266 describes a method of decreasing the total acid number via decarboxylation of organic acids by processing high acidity crude oil under conditions of a temperature of 100~300° C. and a pressure of 1~50 bar, and preferably 200~250° C. and 20~30 bar, using a commercially available hydrogenation catalyst. This method is advantageous because the decrement of the total acid number is high, but additional units such as several separators, strippers, etc., in addition to the reactor should be provided, and the actual processing should be carried out at a high pressure of 20 bar or more. In the case where the reactor is provided before an atmospheric distillation column, it is difficult to adjust the pressure of the reactor system.

Thus, a need still remains for more efficient and profitable methods of removing organic acids, which cause corrosion from crude oil or its fractions in refineries, or substantially reduce the amount thereof.

SUMMARY

Embodiments of the invention provide a method of reducing the amount of organic acids in a hydrocarbon oil fraction, in particular, a method of reducing the amount of organic acids in a hydrocarbon oil fraction via decarboxylation of organic acids using hydrogen or a hydrogen-containing gas and a catalyst under appropriate conditions.

In accordance with at least one embodiment, there is provided a method of effectively removing an organic acid, such as naphthenic acid, which mainly causes corrosion upon crude oil processing.

Embodiments of the present invention provide a method of reducing an amount of an organic acid in a hydrocarbon oil fraction. The method includes the step of hydrogenating the hydrocarbon oil fraction using a hydrogen gas or a hydrogen gas mixture supplied at a $H_2$/oil ratio of about 1-100 (NL/L) under conditions of a temperature of about 300-400° C. and a pressure of about 3-15 kg·f/cm² in the presence of a hydrogenation catalyst. In accordance with at least one embodiment, the hydrocarbon oil fraction is one of a high acidity crude oil or a crude oil fraction.

In accordance with at least one embodiment of the present invention, the organic acid, for example, naphthenic acid, is converted into hydrocarbons via decarboxylation based on the following mechanism, whereby the amount of the organic acid, which causes corrosion upon oil processing, is reduced.

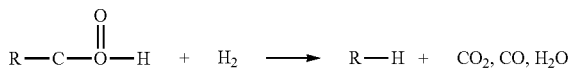

In accordance with at least one embodiment, the hydrocarbon oil fraction is crude oil or biofuel.

In accordance with another embodiment, the hydrocarbon oil fraction is atmospheric residual oil or an upgraded oil fraction.

In accordance with another embodiment, the crude oil or the biofuel is desalinated, and then hydrogenated in the presence of the hydrogenation catalyst under conditions of the temperature of about 300-400° C. and the pressure of about 3-10 kg·f/cm².

In accordance with another embodiment, the atmospheric residual oil or the upgraded oil fraction is hydrogenated in the presence of the hydrogenation catalyst under conditions of the temperature of about 300-400° C. and the pressure of about 10-15 kg·f/cm².

In accordance with another embodiment, the hydrogenation catalyst is selected from the group consisting of a gas oil hydrodesulfurization catalyst, a heavy metal adsorption catalyst for use in desulfurization of atmospheric residual oil or vacuum residual oil, a hydrodesulfurization catalyst, a hydrodenitrogenation catalyst, and mixtures thereof having functions of these catalysts.

In accordance with another embodiment, the hydrogenation catalyst is a catalyst comprising cobalt (Co) and molybdenum (Mo) supported on alumina, a heavy metal adsorption catalyst comprising nickel (Ni) and molybdenum (Mo) supported on alumina, or a hydrodesulfurization catalyst comprising nickel (Ni) and molybdenum (Mo) supported on alumina.

In accordance with another embodiment, the step of hydrogenating the hydrocarbon oil fraction is performed by supplying the hydrogen gas at the $H_2$/oil volume ratio of about 5-30 (NL/L).

In accordance with another embodiment, the hydrogen gas is a gas mixture including about 5-95 wt % of hydrogen.

In accordance with another embodiment, the hydrogen gas is a gas mixture including about 20-80 wt % of hydrogen.

In accordance with another embodiment, the hydrogenation catalyst is a spent catalyst.

In accordance with another embodiment, the hydrocarbon oil fraction is supplied at a liquid hourly space velocity (LHSV) of about 1-5 hr⁻¹ during the hydrogenating step.

In accordance with another embodiment, the hydrocarbon oil fraction is supplied at the LHSV of about 1-3 hr⁻¹.

In accordance with another embodiment, the organic acid is naphthenic acid.

In accordance with another embodiment, the hydrogenated hydrocarbon oil fraction is additionally refined.

In accordance with another embodiment, the hydrogenating step occurs in the absence of a, hydrogenation of a sulfur compound and a nitrogen compound in the hydrocarbon oil fraction.

In accordance with another embodiment, the amount of the organic acid in the hydrocarbon oil fraction is reduced by about 70% or more.

BRIEF DESCRIPTION OF THE DRAWINGS

These and other features, aspects, and advantages of the invention are better understood with regard to the following Detailed Description, appended Claims, and accompanying Figures. It is to be noted, however, that the Figures illustrate only various embodiments of the invention and are therefore not to be considered limiting of the invention's scope as it may include other effective embodiments as well.

DETAILED DESCRIPTION

Figure 1:
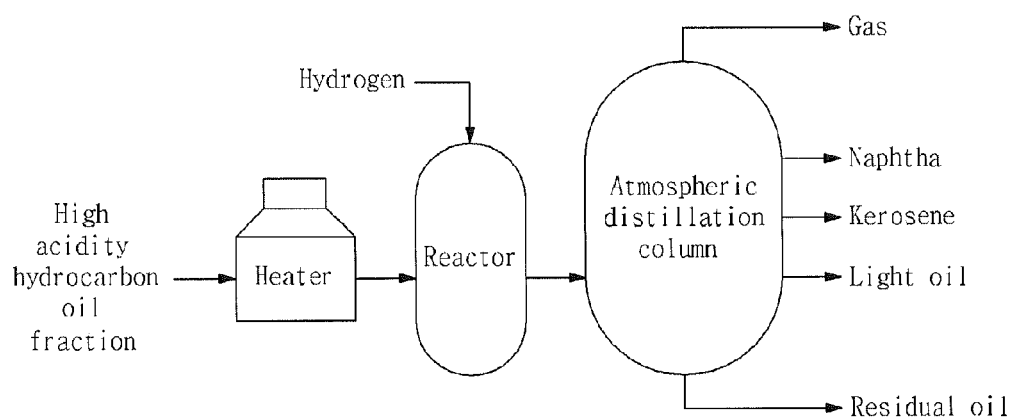
FIG. 1 illustrates a schematic flow diagram of hydrogenation of crude oil using a reactor disposed before an atmospheric distillation column, in accordance with an embodiment of the present invention.

Although the following detailed description contains many specific details for purposes of illustration, it is understood that one of ordinary skill in the relevant art will appreciate that many examples, variations, and alterations to the following details are within the scope and spirit of the invention. Accordingly, the exemplary embodiments of the invention described herein are set forth without any loss of generality, and without imposing limitations, relating to the claimed invention.

As used herein, the term "hydrocarbon oil fraction" means any oil fraction including crude oil, crude oil fractions, atmospheric residual oil obtained after refining of crude oil using atmospheric distillation, upgraded oil fractions (i.e., oil fractions obtained after an upgrading process), biofuels, etc. As used herein, the term "organic acid" means any organic acid, which causes high corrosion action upon processing of hydrocarbon oil fractions. For example, organic acids, according to various embodiments of the invention, include a naphthenic group or a paraffinic group, especially naphthenic acid containing a naphthenic group.

The organic acid content in a hydrocarbon oil fraction is commonly represented by TAN (Total Acid Number, mg KOH/g), and TAN indicates the mass (mg) of KOH consumed to titrate an acid contained in 1 g of a sample. Typically, crude oil having a TAN greater than 0.5 mg/KOH is classified as high acidity crude oil, and thus in an embodiment of the present invention, a high acidity hydrocarbon oil fraction having a TAN greater than about 0.5 mg/KOH may be used as a processing target.

Organic acids do not typically cause corrosion at a low temperature, but manifest very high corrosion activity at a high temperature of 230° C. or more. Organic acids are coupled with a metallic material to produce metal salts, and such metal salts are a causative agent of process problems, such as fouling. Further, organic acids are coupled with water in the course of desalination of crude oil, thus forming stable emulsions, undesirably lowering desalination efficiency. Hence, organic acids must be removed.

As used herein, the term "hydrogenation catalyst" means a commercially available catalyst, which may promote the decarboxylation of organic acids in a hydrocarbon oil fraction, for example, the decarboxylation based on the following mechanism, thus creating hydrocarbons and off-gases, such as carbon dioxide, carbon monoxide, water vapor, etc.

In accordance with embodiments of the present invention, the hydrogenation catalyst includes a hydrotreating catalyst, a desulfurization catalyst, etc., which are commercially available, as non-limiting examples. More specifically, examples thereof include a gas oil hydrodesulfurization catalyst (e.g., a catalyst comprising cobalt (Co) and molybdenum (Mo) supported on alumina), a heavy metal adsorption catalyst for use in desulfurization of atmospheric residual oil or vacuum residual oil (e.g., a heavy metal adsorption catalyst comprising nickel (Ni) and molybdenum (Mo) supported on alumina), a hydrotreating (e.g., desulfurization, denitrogenation) catalyst (e.g., a hydrodesulfurization catalyst comprising nickel (Ni) and molybdenum (Mo) supported on alumina), or mixtures thereof having functions of these catalysts, but are not limited thereto. The hydrogenation catalyst according to various embodiments of the present invention is a fresh catalyst, but a spent catalyst may also be utilized to increase profitability.

In the hydrogenation process, the reduction of organic acid content is linearly increased in proportion to an increase in the reaction temperature. Theoretically, as the reaction temperature is higher, the reduction of organic acid content increases, but the case where the reaction temperature is high may undesirably increase the operation cost to maintain the high reaction temperature. Further, the reaction pressure should be controlled, so as to be adapted for the reaction temperature, in order to prevent the catalyst from being inactivated.

Thus, the hydrogenation process according to various embodiments of the present invention is performed under conditions of a temperature of about 300-400° C. and a pressure of about 3-15 kg·f/cm². Particularly, the temperature of the hydrogenation process falls in the temperature range of the outlet of the heater before the atmospheric distillation column or of the outlet of the atmospheric distillation column, without the need for additional energy to increase the temperature of the reactor.

In an embodiment of the present invention, the hydrocarbon oil fraction is crude oil obtained by arbitrarily subjecting an oil mixture with water to desalination before hydrotreating. For example, crude oil is hydrogenated using hydrogen gas supplied at a $H_2$/oil volume ratio of about 1-100 (1-100 NL of $H_2$/oil L) in the presence of a hydrogenation catalyst under conditions of a temperature of about 300-400° C. and a pressure of about 3-10 kg·f/cm². The hydrogenated crude oil, in accordance with embodiments of the invention, are then subjected to an atmospheric distillation refining process.

In another embodiment of the present invention, the hydrocarbon oil fraction is residual oil obtained after refining of crude oil using atmospheric distillation, and atmospheric residual oil is hydrogenated using hydrogen gas supplied at a $H_2$/oil volume ratio of about 1-100 in the presence of a desulfurization catalyst under conditions of a temperature of about 300-400° C. and a pressure of about 10~15 kg·f/cm².

In the hydrogenation process according to various embodiments of the present invention, the $H_2$/oil volume ratio supplied therefor is set to about 1-100, preferably about 1-10, and more preferably about 1-5. If the $H_2$/oil ratio is high, the operation cost may increase and it is difficult to separate off-gases. In contrast, if $H_2$ is supplied in an excessively low amount, the catalyst may become inactivated. Hence, in the embodiment of the present invention, hydrogen gas is supplied in as small an amount as possible within the range of a $H_2$/oil ratio able to obtain the reduction of organic acid content as desired (about 70% or more).

Although the reduction of organic acid content may vary depending on the kind of hydrocarbon oil fraction, when the reduction of organic acid content in most of hydrocarbon oil fractions is about 70% or more, there is no substantial difference in corrosion due to organic acids. Hence, the reduction of organic acid content may be set to about 70% or more.

Also, hydrogen gas used in the hydrogenation process according to various embodiments of the present invention are pure hydrogen gas, or a hydrogen gas mixture, for example, a gas mixture obtained after hydrogenation. In accordance with at least one embodiment, the gas mixture contains about 5-95 wt %, and preferably about 20-80 wt % of hydrogen. In the case where the gas mixture obtained after the hydrogenation process according to embodiments of the present invention is reused, process efficiency and profitability increases.

In an embodiment of the present invention, the hydrocarbon oil fraction is supplied at the LHSV of about 1-5 $h^{-1}$, preferably about 1-3 $hr^{-1}$, and more preferably about 1-2 $hr^{-1}$, during the hydrogenation process.

Generally, the reduction of organic acid content is linearly decreased in proportion to an increase in the space velocity. If the space velocity is excessively high, inactivation of the catalyst is induced due to high catalyst severity, negatively affecting long-term operation performance of the catalyst. In contrast, if the space velocity is excessively low, the amount of processed hydrocarbon oil fraction may undesirably decrease. Hence, the space velocity is appropriately adjusted within the above range depending on the process conditions and the operating conditions.

In accordance with various embodiments of the invention, the reaction time varies depending on the temperature, properties, acid content, etc. of the hydrocarbon oil fraction to be processed, which may be easily determined by those skilled in the art.

According various embodiments of the present invention, hydrogenation of sulfur compounds and nitrogen compounds in the hydrocarbon oil fraction does not substantially occur by virtue of the combination of process variables as above, and selective deoxygenation of organic acids is possible, ultimately decreasing the consumption of expensive hydrogen.

Meanwhile, in an embodiment of the present invention, a method of more economically reducing the amount of organic acids in a high acidity hydrocarbon oil fraction is provided. To increase profitability of the process, there are, for example, (i) minimizing the addition of hydrogen, (ii) using a gas mixture, and (iii) using a spent catalyst.

In order to treat a high acidity oil fraction, the addition of hydrogen is essential, but the excessive supply of hydrogen undesirably results in increased operation cost and excessive production of off-gases, and thus hydrogen should be supplied at the minimum level capable of removing organic acids, for example, at a $H_2$/oil ratio of 1-100 (NL/L). As such, in accordance with at least one embodiment of the invention, the amount of hydrogen gas which is actually supplied is about 1-10 times, and preferably about 1-5 times, the volume of hydrogen gas to oil.

Also, in the hydrogenation process according to various embodiments of the present invention, hydrogen mixed off-gases generated upon desulfurization of volatile oil or light oil is used as a hydrogen gas source, in addition to the pure hydrogen gas. When the hydrogen gas mixture is used, off-gases are appropriately selected taking into consideration the effect of impurities, etc. remaining in the off-gases on the catalyst. On the other hand, in the case of using a spent catalyst having activity among catalysts employed in the refining process, profitability of the processing of a high acidity hydrocarbon oil fraction increases. In an illustrative reaction, the results of a pilot test using the spent catalyst showed that the reductions of organic acid content using the new catalyst and the spent catalyst were similar (see Examples).

Figure 2:
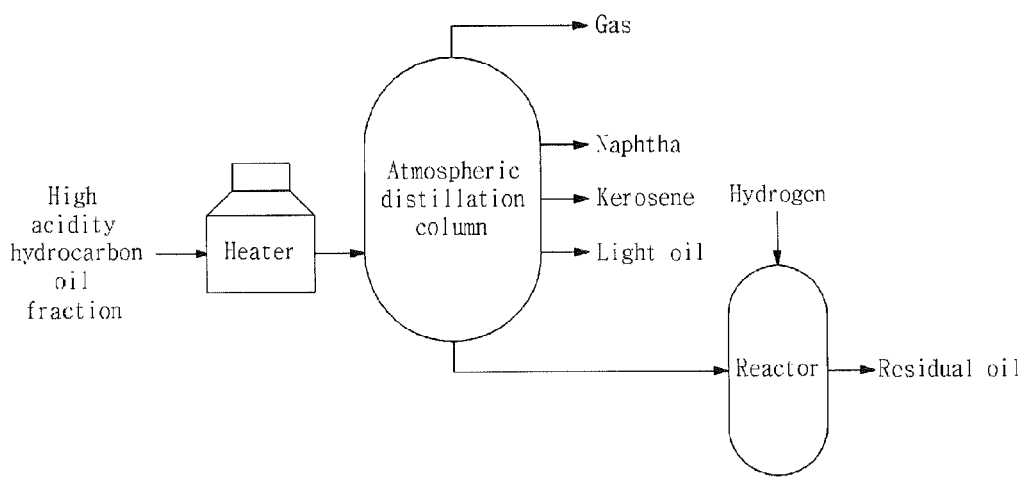
FIG. 2 illustrates a schematic flow diagram of hydrogenation of atmospheric residual oil obtained after distillation of crude oil, in accordance with an embodiment of the present invention.

The hydrogenation process according to various embodiments of the present invention for reducing the amount of organic acids in the hydrocarbon oil fraction are carried out before or after atmospheric distillation, as illustrated in FIGS. 1 and 2.

With reference to FIG. 1, according to an embodiment of the present invention, a high acidity hydrocarbon oil fraction is fed into a heater, so that it is heated up to a temperature of an inlet of an atmospheric distillation column. The heated hydrocarbon oil fraction is fed into a hydrogenation reactor for reducing the amount of organic acids disposed after the heater. The hydrogenation reactor for reducing the amount of organic acids is filled with a hydrogenation catalyst and is maintained under appropriate reaction conditions, while continuously supplying hydrogen gas necessary for reducing the amount of organic acids. The hydrocarbon oil fraction is fed into the atmospheric distillation column from the reactor, so that it may be subjected to an upgrading process without corrosion.

With reference to FIG. 2, according to another embodiment of the present invention, a high acidity hydrocarbon oil fraction heated in a heater is first fed into an atmospheric distillation column, so that organic acids in the hydrocarbon oil fraction are concentrated in residual oil upon atmospheric distillation. The high acidity residual oil discharged from the atmospheric distillation column has a temperature suitable for use in the reaction which reduces the amount of organic acids, and is fed into a hydrogenation reactor for reducing the amount of organic acids filled with a catalyst, together with hydrogen. The residual oil, the organic acid content of which is reduced in the reactor, is then subjected to an upgrading process.

The process of the present invention is continuously carried out, and the reactor is disposed after the heater before the atmospheric distillation column, or is disposed after the atmospheric distillation column, whereby the process operation is possible without the need for additional energy. Moreover, the use of the spent catalyst and the hydrogen gas mixture enables the process to operate even when only the reactor is provided without additional process equipment. Further, the high acidity hydrocarbon oil fraction is pre-processed in the atmospheric distillation process, thus eliminating various problems, such as corrosion and so on, due to the organic acids in the upgrading process.

A better understanding of various embodiments of the present invention may be obtained through the following examples which are set forth to illustrate, but are not to be construed as limiting, the scope of the present invention defined in claims which will be described later.

Example 1

Reduction of Organic Acid Content in Hydrocarbon Oil Fraction Using Hydrogen Gas A high acidity hydrocarbon oil fraction (Feed: PENGLAI as high acidity crude oil made in China) and 1 wt % of a hydrodesulfurization catalyst for use in an atmospheric residual oil desulfurization process comprising Ni and Mo supported on alumina, based on the weight of the oil fraction, were placed in an autoclave. The total acid number (TAN) of the high acidity hydrocarbon oil fraction was about 2.0. The experiment was conducted at 350° C., and the mixture of high acidity hydrocarbon oil fraction and catalyst in the reactor was stirred at a stirring rate of 1000 rpm using a mechanical stirrer. To sufficiently supply gas (hydrogen, nitrogen) necessary for the reaction, the gas was initially charged at 20 kg·f/cm$^2$ in the reactor, and the reactor was maintained in a closed system during the reaction for reducing the amount of organic acids. After the reaction for a total of 5 hr, the temperature of the reactor was lowered to room temperature within the shortest time using a coolant, after which the TAN of the obtained oil product was measured (TAN measurement: ASTM D664).

The reaction for reducing the amount of organic acids was carried out under the same conditions as in the above experiment, except for the supply of nitrogen instead of hydrogen. As shown in Table 1 below, the reduction of organic acid content upon hydrogen supply was increased by three times or more compared to upon nitrogen supply.

TABLE 1

|  | Feed TAN (mgKOH/g) | Product TAN (mgKOH/g) | Reduction (%) |
|---|---|---|---|
| Hydrogen supply | 2.0 | 0.4 | 80 |
| Nitrogen supply | 2.0 | 1.5 | 25 |

Example 2

Reduction of Organic Acid Content in Hydrocarbon Oil Fraction Depending on Reaction Conditions A continuous reactor was filled with 50~100 ml of a commercially available desulfurization catalyst for atmospheric residual oil. The reactor was maintained under conditions of 360° C. and 5 kg·f/cm$^2$, a high acidity hydrocarbon oil fraction having a TAN of about 2 was allowed to flow at 50~200 ml/hr (LHSV of 1~5 hr$^{-1}$) from a feed tank, and hydrogen was continuously supplied into the reactor in an amount corresponding to 5~25 times the volume of the hydrocarbon oil fraction, so that they were reacted.

In the continuous operation type of reaction as above, the reduction of organic acid content in the high acidity hydrocarbon oil fraction was evaluated depending on the reaction conditions.

Example 2-1

Reduction of Organic Acid Content in Hydrocarbon Oil Fraction Depending on Reaction Temperature

TABLE 2

| Reaction Temp. (° C.) | Feed TAN (mgKOH/g) | Product TAN (mgKOH/g) | Reduction (%) |
|---|---|---|---|
| 250 | 2.1 | 1.8 | 14 |
| 300 | 2.1 | 1.1 | 48 |
| 350 | 2.1 | 0.4 | 81 |

As is apparent from Table 2, as the reaction temperature became higher, the reduction of organic acid content was increased.

Example 2-2

Reduction of Organic Acid Content in Hydrocarbon Oil Fraction Depending on the Amount of Supplied Hydrogen

TABLE 3

| $H_2$/oil ratio | Feed TAN (mgKOH/g) | Product TAN (mgKOH/g) | Reduction (%) |
|---|---|---|---|
| 25 | 2.4 | 0.6 | 75 |
| 75 | 2.4 | 0.5 | 79 |
| 100 | 2.4 | 0.6 | 75 |

As is apparent from Table 3, the reduction of organic acid content was maintained high under conditions of hydrogen supply in the predetermined range.

Example 2-3

Reduction of Organic Acid Content in Hydrocarbon Oil Fraction Depending on LHSV

TABLE 4

| LHSV | Feed TAN (mgKOH/g) | Product TAN (mgKOH/g) | Reduction (%) |
|---|---|---|---|
| 1 | 2.3 | 0.5 | 78 |
| 3 | 2.3 | 1.1 | 52 |
| 5 | 2.3 | 1.6 | 30 |

As is apparent from Table 4, as LHSV became higher, the reduction of organic acid content was decreased.

Example 2-4

Reduction of Organic Acid Content in Hydrocarbon Oil Fraction Using Gas Mixture

TABLE 5

| Hydrogen in gas mixture (%) | Feed TAN (mgKOH/g) | Product TAN (mgKOH/g) | Reduction (%) |
|---|---|---|---|
| 50 | 2.50 | 0.63 | 75 |
| 75 | 2.50 | 0.44 | 83 |

Through the continuous operation type of reaction, the experiment was conducted using the gas mixture comprising hydrogen and nitrogen, instead of highly pure hydrogen. As is apparent from Table 5, even when the amount of hydrogen in the gas mixture was 50%, the reduction of organic acid content was 75% or more.

Example 3

Reduction of Organic Acid Content in Residual Oil Fraction

A continuous reactor was filled with 50~100 ml of a hydrodesulfurization catalyst for use in an atmospheric residual oil desulfurization process comprising Ni and MO supported on alumina. The reactor was maintained under conditions of 345° C. and 12.5 kg·f/cm², a high acidity hydrocarbon oil fraction (Feed: atmospheric residual oil fraction of Dar Blend as the high acidity crude oil made in Africa) having a TAN of about 4 was allowed to flow at 50~100 ml/hr (LHSV of 1 hr$^{-1}$) from a feed tank, and hydrogen was continuously supplied into the reactor in an amount corresponding to 5~25 times the volume of the hydrocarbon oil fraction, so that they were reacted.

In the continuous operation type of reaction as above, the reduction of organic acid content in the high acidity hydrocarbon oil fraction was evaluated depending on the reaction conditions.

Example 3-1

Reduction of Organic Acid Content in Residual Oil Fraction Depending on the Amount of Supplied Hydrogen

TABLE 6

| $H_2$/residual oil ratio | Feed TAN (mgKOH/g) | Product TAN (mgKOH/g) | Reduction (%) |
|---|---|---|---|
| 5 | 4.24 | 1.10 | 74 |
| 10 | 4.24 | 1.06 | 75 |
| 25 | 4.49 | 1.04 | 77 |
| 50 | 4.49 | 1.00 | 78 |
| 75 | 4.49 | 0.97 | 78 |
| 100 | 4.49 | 0.68 | 85 |

When the high acidity residual oil was treated with hydrogen gas at a $H_2$/oil ratio in a predetermined range according to the present invention, the reduction of organic acid content in the residual oil was 70% or more.

Example 3-2

Reduction of Organic Acid Content in Residual Oil Fraction Using Spent Catalyst

TABLE 7

|  | Feed TAN (mgKOH/g) | Product TAN (mgKOH/g) | Reduction (%) |
|---|---|---|---|
| New catalyst | 4.2 | 0.9 | 78 |
| Spent catalyst | 4.2 | 1.1 | 74 |

The test for reducing the amount of organic acids in the residual oil having a TAN of 4.2 mgKOH/g was conducted under the same continuous operation type of reaction conditions as in Example 2 using the new catalyst or the spent catalyst (which is a desulfurization catalyst comprising Ni and Mo supported on alumina, used for 11 months in an atmospheric residual oil desulfurization process). As is apparent from Table 7, even when the spent catalyst was used, the reduction of organic acid content was similar to when using the new catalyst. Thus, the activity of the spent catalyst was regarded as an industrially usable level in terms of reducing the amount of organic acids.

Example 3-3

Reduction of Organic Acid Content in Residual Oil Fraction Using Gas Mixture

TABLE 8

| Hydrogen in gas mixture (%) | Feed TAN (mgKOH/g) | Product TAN (mgKOH/g) | Reduction (%) |
|---|---|---|---|
| 75 | 4.2 | 1.2 | 71 |
| 25 | 4.2 | 1.6 | 62 |

Example 4

Changes in Components of Hydrocarbon Oil Fraction

TABLE 9

|  | C (wt %) | H (wt %) | N (wt %) | S (wt %) | O (wt %) |
|---|---|---|---|---|---|
| High acidity hydrocarbon sample | 87.2 | 12.5 | 0.67 | 0.13 | 0.72 |
| TAN reduction 87% sample | 87.5 | 12.3 | 0.65 | 0.11 | 0.44 |
| TAN reduction 59% sample | 87.2 | 12.3 | 0.66 | 0.12 | 0.52 |

After the process for reducing the amount of organic acids, there were no significant changes in nitrogen and sulfur contents in the hydrocarbon oil fraction sample, and such changes were at an almost negligible level.

Embodiments of the present invention provide a method of reducing the amount of organic acids, which can effectively reduce the amount of organic acids having high corrosion activity under mild conditions at a comparatively low pressure. According to various embodiments of the present invention, process variables are appropriately combined, so as to be applicable to current refineries, so that the amount of organic acids in a high acidity hydrocarbon oil fraction can be more economically and efficiently reduced under mild conditions, and thereby the actual process, which can be industrially directly utilized, is provided.

Embodiments of the invention provide non-obvious advantages over conventional processes of converting organic acids in a hydrocarbon oil fraction. In particular, embodiments of the invention provide a method of reducing an amount of organic acids, whereby organic acids, which cause corrosion upon crude oil processing, can be effectively removed under mild conditions at a comparatively low pressure. In accordance with at least one embodiment, there is provided a method of efficiently reducing the amount of organic acids in high acidity crude oil or its fractions under appropriate hydrogenation conditions before or after atmospheric distillation.

Although the embodiments of the present invention have been disclosed for illustrative purposes, those skilled in the art will appreciate that a variety of different modifications and variations are possible, without departing from the scope and spirit of the invention. Accordingly, such modifications and variations should also be understood as falling within the claims of the present invention.

We claim:

1. A method of reducing an amount of an organic acid in a hydrocarbon oil fraction, comprising the step of:
   hydrogenating the hydrocarbon oil fraction using a hydrogen gas supplied at a $H_2$/oil ratio of about 1-100 (NL/L) in the presence of a hydrogenation catalyst under conditions of a temperature of about 300-400° C. and a pressure of about 3-15 kg·f/cm$^2$,
   wherein the hydrogen gas is a gas mixture comprising about 25-75 wt % of hydrogen,
   wherein the hydrogenation catalyst is a spent catalyst having activity among catalysts employed in a refining process, and
   wherein the amount of the organic acid in the hydrocarbon oil fraction is reduced by about 70% or more.

2. The method of claim 1, wherein the hydrocarbon oil fraction is crude oil or biofuel.

3. The method of claim 1, wherein the hydrocarbon oil fraction is atmospheric residual oil or an upgraded oil fraction.

4. The method of claim 2, wherein the crude oil or the biofuel is desalinated, and then hydrogenated in the presence of the hydrogenation catalyst under conditions of the temperature of about 300-400° C. and the pressure of about 3-10 kg·f/cm$^2$.

5. The method of claim 3, wherein the atmospheric residual oil or the upgraded oil fraction is hydrogenated in the presence of the hydrogenation catalyst under conditions of the temperature of about 300-400° C. and the pressure of about 10-15 kg·f/cm$^2$.

6. The method of claim 1, wherein the hydrogenation catalyst is selected from the group consisting of a gas oil hydrodesulfurization catalyst, a heavy metal adsorption catalyst for use in desulfurization of atmospheric residual oil or vacuum residual oil, a hydrodesulfurization catalyst, a hydrodenitrogenation catalyst, and mixtures thereof having functions of these catalysts.

7. The method of claim 6, wherein the hydrogenation catalyst is a catalyst comprising cobalt (Co) and molybdenum (Mo) supported on alumina, a heavy metal adsorption catalyst comprising nickel (Ni) and molybdenum (Mo) supported on alumina, or a hydrodesulfurization catalyst comprising nickel (Ni) and molybdenum (Mo) supported on alumina.

8. The method of claim 1, wherein the step of hydrogenating the hydrocarbon oil fraction is performed by supplying the hydrogen gas at the $H_2$/oil ratio of about 5-30 (NL/L).

9. The method of claim 1, wherein the hydrocarbon oil fraction is supplied at a LHSV (liquid hourly space velocity) of about 1-5 hr-1 during the hydrogenating step.

10. The method of claim 9, wherein the hydrocarbon oil fraction is supplied at the LHSV (liquid hourly space velocity) of about 1-3 hr-1.

11. The method of claim 1, wherein the organic acid is naphthenic acid.

12. The method of claim 4, wherein the hydrogenated hydrocarbon oil fraction is additionally refined.

13. The method of claim 1, wherein the hydrogenating step occurs in the absence of a hydrogenation of a sulfur compound and a nitrogen compound in the hydrocarbon oil fraction.

* * * * *